United States Patent [19]
Fabris et al.

[11] Patent Number: 5,308,095
[45] Date of Patent: May 3, 1994

[54] STEERING AXLE FOR VEHICLES

[75] Inventors: Armando Fabris, Campodarsego;
Gianni Massaccesi, Vigodarzere;
Timante Carraro, Campodarsego;
Santino Pirotta, Vaprio D'Adda, all of Italy

[73] Assignee: Carraro S.p.A., Campodarsego, Italy

[21] Appl. No.: 835,542

[22] Filed: Feb. 14, 1992

[30] Foreign Application Priority Data

Feb. 14, 1991 [IT] Italy .................. PD91 A 000034
Nov. 22, 1991 [IT] Italy .................. PD91 A 000216

[51] Int. Cl.$^5$ .............................................. B62D 3/02
[52] U.S. Cl. ................................... 280/93; 280/95.1
[58] Field of Search ............... 280/93, 91, 95.1, 846

[56] References Cited

U.S. PATENT DOCUMENTS

| | | | |
|---|---|---|---|
| 4,504,074 | 3/1985 | Smith | 280/93 |
| 4,515,380 | 5/1985 | Schumacher | 280/93 |
| 4,652,011 | 3/1987 | Hollerweger et al. | 280/846 X |
| 5,197,561 | 3/1993 | Holka | 280/95.1 X |

FOREIGN PATENT DOCUMENTS 60-1075  1/1985  Japan .

*Primary Examiner*—Joseph D. Pape
*Attorney, Agent, or Firm*—Sughrue, Mion, Zinn, Macpeak & Seas

[57] ABSTRACT

An axle is disclosed which comprises a beam designed for conventional installation on the load-bearing structure of a vehicle, and has, journalled on its opposite ends, road wheel hubs subject to be steered through a steering actuator and being interlinked by a bevel-gear steering drive, such that their relative angular movements can be synchronized to suit pre-determined transmission parameters; the steering actuator is fully supported on the beam and has a stationary part which is rigid with the beam and independent of the load-bearing structure of the vehicle and a moveable part which is connected to the wheel hubs through the steering drive.

21 Claims, 6 Drawing Sheets

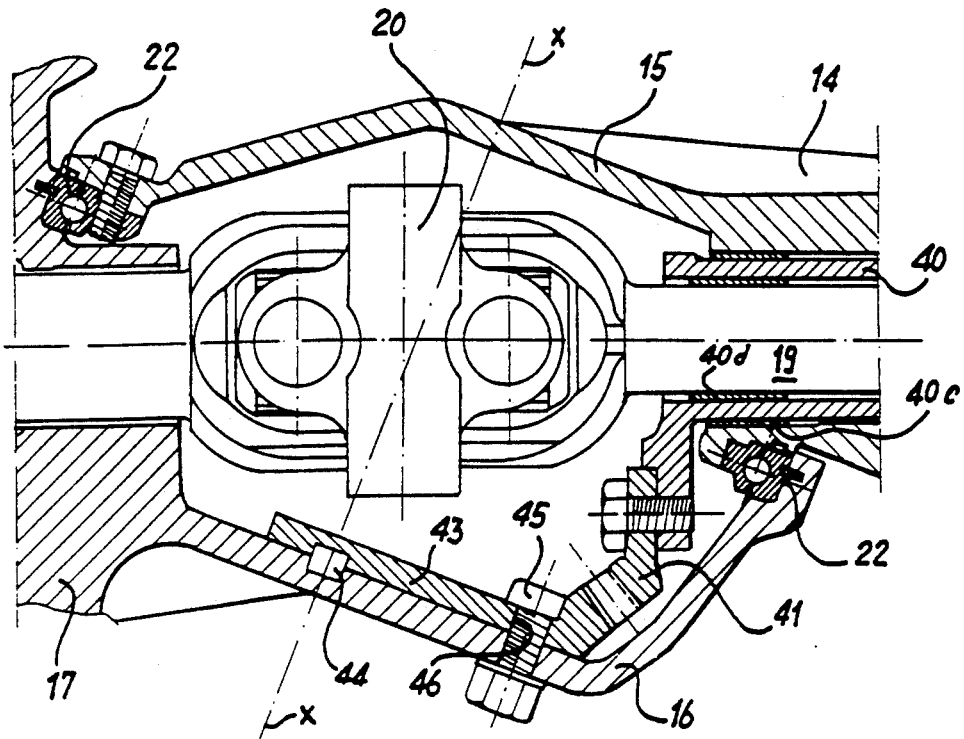
Fig. 4
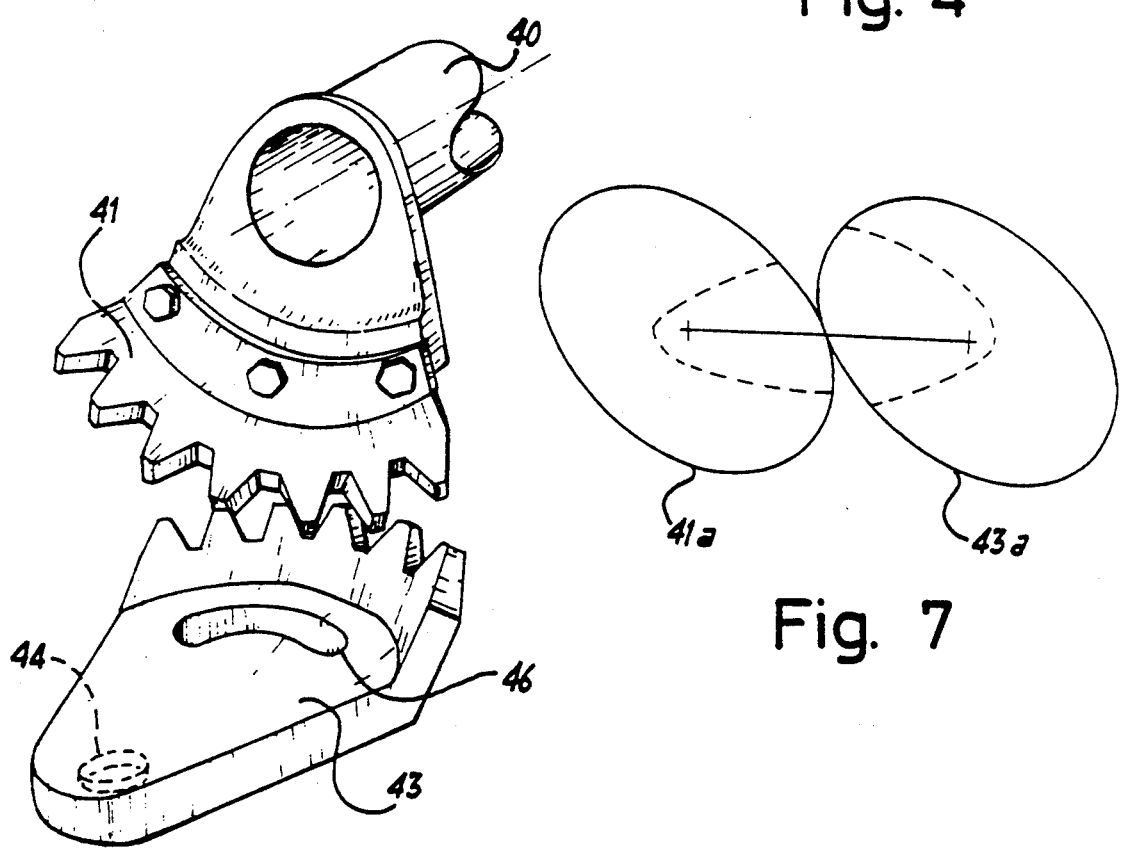
Fig. 5
Fig. 7

STEERING AXLE FOR VEHICLES

BACKGROUND OF THE INVENTION

This invention relates to a steering axle for vehicles, being of a type which comprises:

a beam arranged for conventional mounting to the load-bearing structure of a vehicle;

a road wheel hub supported rotatably on each of the two opposite longitudinal ends of the beam;

a steering actuator arranged to act on at least one of said road wheel hubs; and a steering drive interconnecting the two road wheel hubs to synchronize their relative angular displacements in accordance with pre-determined drive parameters, said steering drive comprising two shafts, synchronously counter-rotating relatively to each other and being rotatively connected to the corresponding one of the hubs through respective angle transfer gear mechanisms, said transfer mechanisms including first and second gears keyed respectively to the end of said shaft next to the corresponding hub and being made rotatively rigid with said hub.

An axle with the above features is known from JP-A-60-1075.

The axle shown in that document is provided with a gear-type steering system operated through a steering actuator for pivoting the road wheel hubs fitted to the opposite ends of the beam.

That actuator is attached to the load-bearing structure of the vehicle and has an output shaft which carries, keyed to its free end, one gear of the steering system. The shaft extends through a bore in the load-bearing structure of the vehicle and a corresponding tubular passageway formed in the respective journal formation on the beam.

A steering axle to that design has a number of drawbacks.

First, the actuator is mounted at a location where it is subject to shocks and may come to harm. This is more likely to occur when the axle is used on such all-terrain vehicles as agricultural tractors, where the probability of shocks is relatively high.

Secondly, with the above construction, relative rotation is allowed to take place both between the actuator shaft and the corresponding journal formation, as well as between the latter and the load-bearing structure of the tractor whereto said actuator is, in turn, attached. The corresponding journal formation of the beam intervenes, therefore, between the actuator shaft and the load-bearing structure of the vehicle, while being mounted to swing with respect to either. Accordingly, the machining tolerances for the different component parts add algebraically to one another, to establish operating conditions that make the required oil-tight fits between the axle beam and the actuator shaft difficult to achieve. This problem is made the more serious by that the standard admissible tolerances for journal formations in the agricultural tractor industry are comparatively large. Further, with that design, the axle tends to steer, even with the steering wheel held still, every time that it is caused to perform swinging movements relatively to the vehicle structure, and this on account of the steering system gears being forced to roll about the actuator gear whenever such a situation of relative oscillation is encountered. Thus, the structure proposed in said document is unsuited to such applications.

It should be also noted that in the axle according to the Japanese Patent the drive which connects the axle shaft to the road wheel hub to drive the latter is of a type comprising a bevel gear pair. This drive arrangement increases the vertical dimension of the axle in the area of swivel connection to the road wheel hubs.

A further consequence of this prior structure is that, as a torque is transferred between the axle shaft and the wheel hub, radial thrust forces appear between the bevel gear pair. The radial thrust is discharged, on the axle shaft side, to a specially provided support which carries, at a location proximate to the corresponding gear, the axle shaft and the corresponding coaxial tubular shaft from the axle steering drive. The structure shown has a first bearing between the axle shaft and the tubular shaft of the steering drive, and a second bearing between the tubular shaft and a supporting flange rigid with the axle beam. It follows that the aforesaid radial thrust will be discharged to the support through the two bearings and the tubular shaft. Due to the frictional resistances that arise unavoidably from the above situation of radial loading, the torque being transferred between the axle shaft and the wheel hub makes an undesirable effect felt on the steering drive. This effect is the more apparent the higher is the torque being transferred through the axle shaft.

Other known axles to more traditional designs are equipped with a steering drive which includes a quadrilateral linkage effective under steer to cause the centers of rotation of the steering axle wheels, respectively on the turn inside and outside, to be coincident. This arrangement has substantially the shape of an isosceles trapezoid whose major base is formed by the axle section included between the two stub axles for the wheel hubs, oblique sides are the steering arms rigid with the respective hubs, and minor base is a rod tying the steering arms together.

With that quadrilateral linkage configuration, the centers of rotation are brought to coincide when the extension lines from the steering arms intersect approximately on the centerline of the rear axle. It follows that this alignment will be dependent on several factors, such as the vehicle wheelbase, tread (as a function of the stub axle spacing), etc. In many cases, however, an axle is manufactured without all the parameters of its ultimate utilization being known, or is intended for installation on vehicles having different parameters, or is of an adjustable type whose adjustments affect the steering geometry. Such axles cannot ensure, therefore, an appropriate steering geometry for every installation and/or adjustment, e.g. every tread adjustment.

In addition, axles of that kind are comparatively bulky constructions due both to the steering arms and the tie rod provided. The intrusive steering arms, by interfering with structural members of the vehicle, may become a limiting factor of the maximum steering angle afforded. Further, the steering arms and tie rod are both subject to shocks and the actions of such environmental agents as dirt, mud, and dust, all apt to deteriorate them over time.

To obviate in part the problems posed by the space requirements, axles are employed which have steering actuators of the double-acting, two-rod hydraulic jack type mounted close against the box-type structure of the axle. The jack rods are swivel-associated with their respective steering arms through struts. This construction, however, makes for inaccurate steering geometry, which frequently results in a small, but perceivable, amount of tyre slip in the radial direction on a turn.

SUMMARY OF THE INVENTION

It is the invention object to provide a steering power axle whose construction can overcome the drawbacks of the aforementioned known axles.

This object is achieved, in a first embodiment of the invention, by an axle as indicated in the preamble being characterized in that said actuator comprises a stationary part which is rigid with the beam and independent of the load-bearing structure of the vehicle, and a movable part relatively to said stationary part which is connected to said road wheel hubs through said steering drive.

BRIEF DESCRIPTION OF THE DRAWINGS

The features and advantages of the invention will become apparent from the following detailed description of some exemplary embodiments thereof, as shown by way of illustration and not of limitation in the accompanying drawings, wherein:

FIG. 4 is a fragmentary longitudinal section view taken at one road wheel hub of the axle in FIG. 1;

FIG. 5 is a perspective view of an angle transfer mechanism in the axle of the previous FIGS.;

FIG. 7 diagramatically illustrates developed pitch lines for one embodiment of the gears which make up the angle transfer mechanism in the axles shown in the previous FIGS.;

DETAILED DESCRIPTION OF THE INVENTION

Figure 1:
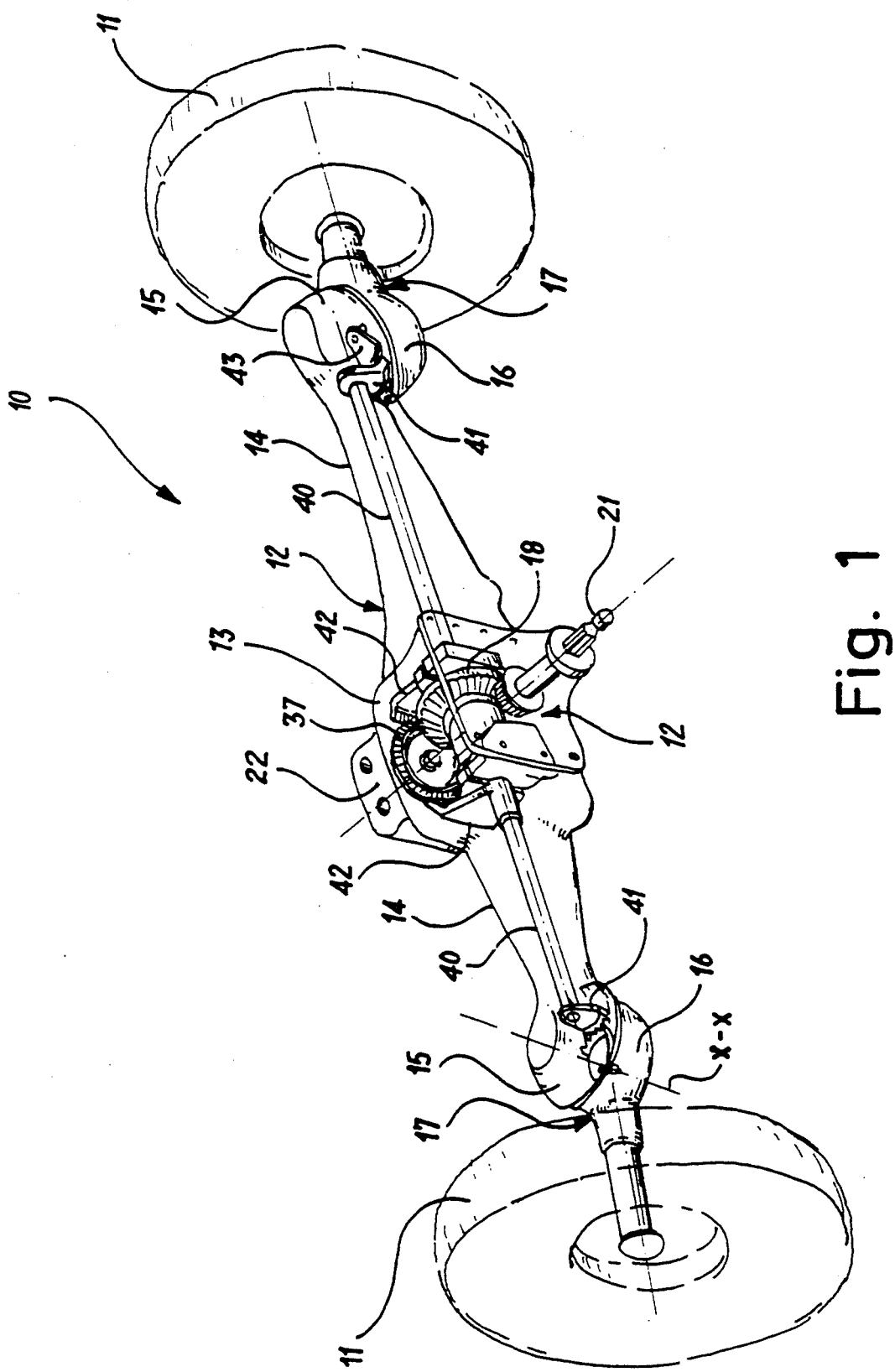
FIG. 1 is a perspective view showing schematically a steering power axle embodying this invention.
Figure 3:
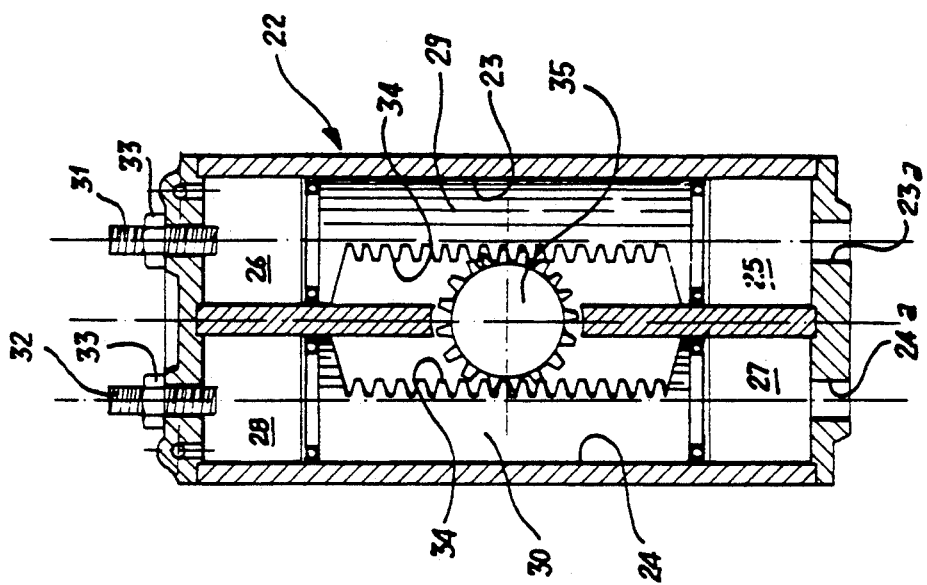
FIG. 3 is a sectional view taken along line III—III in FIG. 2.
Figure 2:
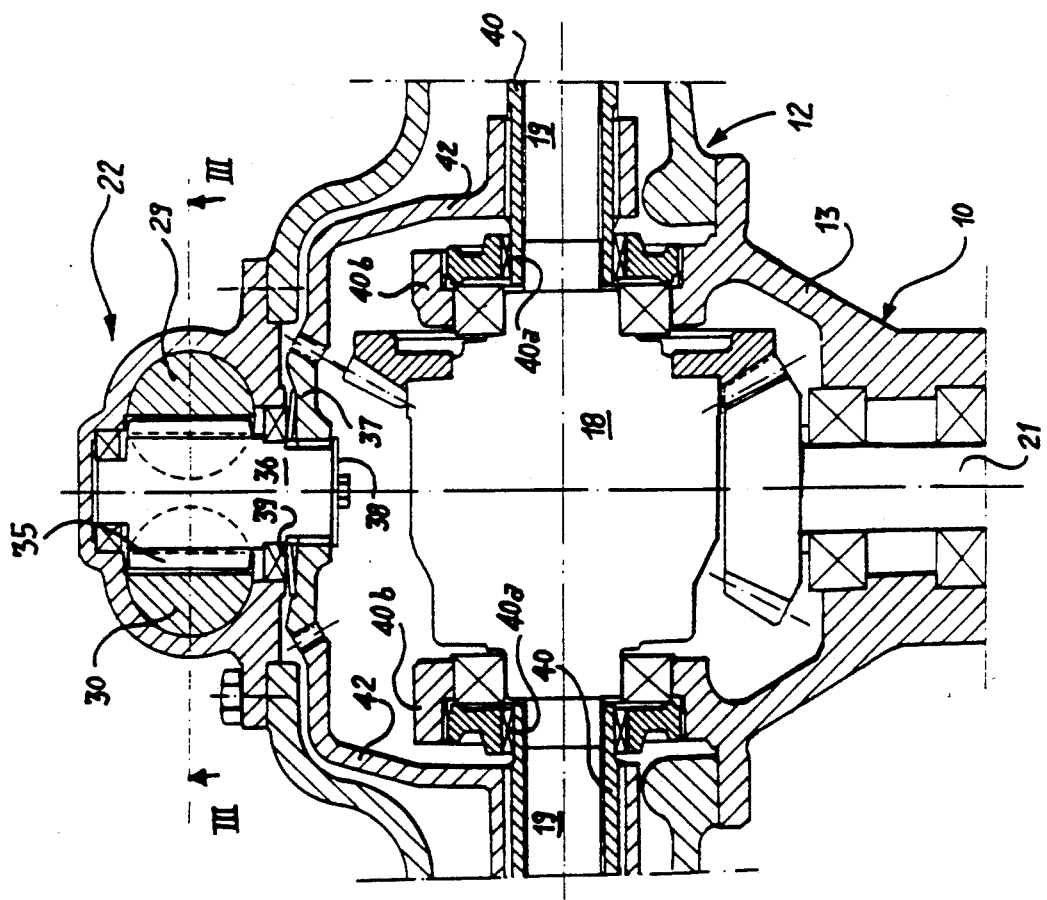
FIG. 2 is a fragmentary longitudinal section view of the axle shown in FIG. 1.

Shown in FIG. 1 is an axle 10 which interconnects the driving road wheels 11 of a tractor.

This axle 10 comprises a beam of closed box-type construction, generally shown at 12, which is formed of a middle part 13, two tubular parts 14 extending along opposite directions from the middle part 13, and two cup-shaped bodies 15 located at the ends of the respective tubular parts 14. Dependent on the type of installation for which the axle is designed, the beam 12 may be provided with conventional journal formations, not shown, for swing mounting to the load-bearing structure of a vehicle (not shown), as would be typical in the instance of a front steering axle of an agricultural tractor, or conventionally attached to said load-bearing structure.

Each cup-shaped body 15 is conventionally coupled for rotation about pivot axis X—X (FIG. 4) to a corresponding cup-shaped body 16 rigid with the hub 17 of a road wheel 11. The coupling is made pivotable by the provision of a bearing 22 between the cup-shaped bodies 15, 16.

The closed box-type construction of the beam 12 accommodates such transmission members as a differential mechanism 18, two axle shafts 19, and two equal-velocity couplings 20, of which only one is shown in FIG. 4. The differential mechanism 18 is received in the middle part 13 of the box-type construction 12, the two axle shafts 19 are received in the two tubular parts 14, and the two equal-velocity couplings 20 are received inside the two cup-shaped body pairs 15 and 16. Said couplings 20 have been omitted from FIG. 1 for clarity. The differential mechanism 18 receives its motion from a drive shaft 21 and distributes it to the two axle shafts 19; the axle shafts 19 transfer then the motion in a manner known per se to the road wheels 11 via the equal-velocity couplings 20.

The closed box-type construction 12 also houses a steering arrangement which acts on the cup-shaped body pairs 15 and 16 to pivot the two cup-shaped bodies 15 and 16 of each pair relatively to each other.

Said steering arrangement includes a hydraulic actuator, generally shown at 22, which is rigid with the middle body 13 and has two cylindrical recesses 23, 24, parallel and spaced apart from each other, each recess having a respective piston 29, 30 slidable tightly therein which defines two supply chambers 25, 26 and 27, 28, respectively, in each recess for a pressurized medium, typically a pressurized oil. Chambers 25 and 28, opposite to each other, as well as chambers 26 and 27, are communicated to each other by connection conduits, not shown, and are supplied through ports 23a, 24a. A respective threaded rod 31, 32 projects in an adjustable manner (and is locked by means of a nut 33) into the two chambers 26 and 28 to provide a travel limiter for the respective piston 29, 30, and hence, a steering limiter for the axle, as explained hereinafter.

The two pistons 29, 30 have respective cutouts facing each other and being formed with teeth, rack-fashion 34. Included between said racks, and enmeshed therewith, is a gear wheel 35 which is keyed to or integral with a shaft 36 carried rotatably on the axle body 13 and protruding thereinto. Keyed to that shaft 36 is a bevel gear 37, referred to hereinafter as the central gear. It should be noted that gear 37 is made rotatively rigid with shaft 36 but allowed a limited sliding movement therealong and biased elastically toward a stop washer 38 by a Belleville washer or some other spring means 39.

In addition to the steering actuator, the steering arrangement includes a steering drive which interlinks the two wheel hubs 17 to synchronize their angular movements relative to the box-type construction of the axle in conformity with pre-determined drive parameters.

This steering arrangement comprises two tubular shafts 40, one for each hub 17, which extend coaxially with and are supported rotatably around the axle shafts 19, each tubular shaft having first and third gears 41 and 42 keyed to its opposite ends.

At their keyed end to the gear 42, the tubular shafts 40 are supported by means of bearings 40a on the same supports 40b which carry the differential mechanism 18 rotatably within the beam 12. They are supported at the opposite end in a corresponding seat in the beam 12 by a bearing 40c. It should be noted that an additional bearing 40d intervenes between each tubular shaft 40 and the corresponding axle shaft 19 at the end keyed to gear 41, thereby the axle shaft is supported in the same seat of the beam 12 by bearing 40d, bearing 40c, and the portion of tubular shaft 40 extending therebetween. It should be noted, however, that despite this arrangement of the support for the steering drive and the axle shaft at gear 41, the steering drive is substantially unaffected by the torque transferred through the axle shaft because, with the equal-velocity coupling 20 provided for transferring motion to the hub 17, the radial loads on the bearings 40c,d from said torque are significantly reduced.

The first gear 41 enmeshes with a second gear 43 secured inside the cup-shaped body 16 for the corresponding hub 17. Said first and second gears are bevel gears and jointly form an angle transfer mechanism. The second gear 43 is retained within the cup-shaped body 16 by a pin 44 and a screw 45 passed through a slot 46. Said gear can therefore be rotated relatively to the hub 17 so that the amount of toe-in of the road wheels 11 can be adjusted by loosening the screw 45.

Said first and second gears 41, 43 have preferably a pitch line 41a, (FIG. 7)designed to provide a drive ratio that varies with the steering angle. The law for such variation can be obtained through mathematical computations based on the geometric parameters of the axle, such as the wheel base and the distance between the rotation axes of the hubs 17. Thus, the rotations of the wheel on the turn inside and that on the turn outside can be accommodated to suit the steering angle.

Variations to the wheelbase of the vehicle can be accommodated in a comparatively simple and economical way by exchanging the first and second gears for other gears having a different pitch line. Practical observations have shown that the optimum pitch line follows a pattern which is either oval or near-elliptical (FIG. 7).

To have the shafts 40 counter-rotate to each other, thereby an impulse to steer can be suitably transmitted to the two hubs 17, the third gear 42 of each shaft 40 is in mesh engagement with the central gear 37 on diametrically opposite sides thereof. Gears 42 are also bevel gears. Said first, second and third gears 41-43 are in the form of gear segments.

To steer the axle 10, oil is supplied under pressure by means of a conventional control valve operated through a steering wheel. not shown, into one of the chamber pairs 25, 28 or 26, 27 of the steering actuator 22, while the other pair is communicated to the discharge end.

As a result of the pistons 29 and 30 being moved in opposite directions, the gear wheel 35 and central gear 37 are rotated. It should be further noted that the Belleville washer 39 keeps the central gear 37 urged against the third gears 42, to take up any backlash therebetween. This washer also produces, due to the bevel design of the central gear 37 and third gears 42, an axial force on the shafts 40 tending to take up any backlash between the first and second gears 41, 43.

Rotation of the central gear causes each shaft 40 and corresponding first gear 41 of the angle transfer mechanism to perform a similar but oppositely directed rotation at the hub. Owing to the particular pitch line of the first and second gears, the rotational angle about the axis X—X of the hub on the turn inside will be different (greater) than the corresponding angle turned by the outside hub, thereby compensating for the different paths travelled by the two road wheels 11. It should be noted that, in quite a similar manner, instead of using a non-circular pitch line for the angle transfer mechanisms at the wheel hubs 17, this pitch line could be used for the third gears 42 and corresponding gear segments enmeshed therewith at the central gear 37.

Figure 6:
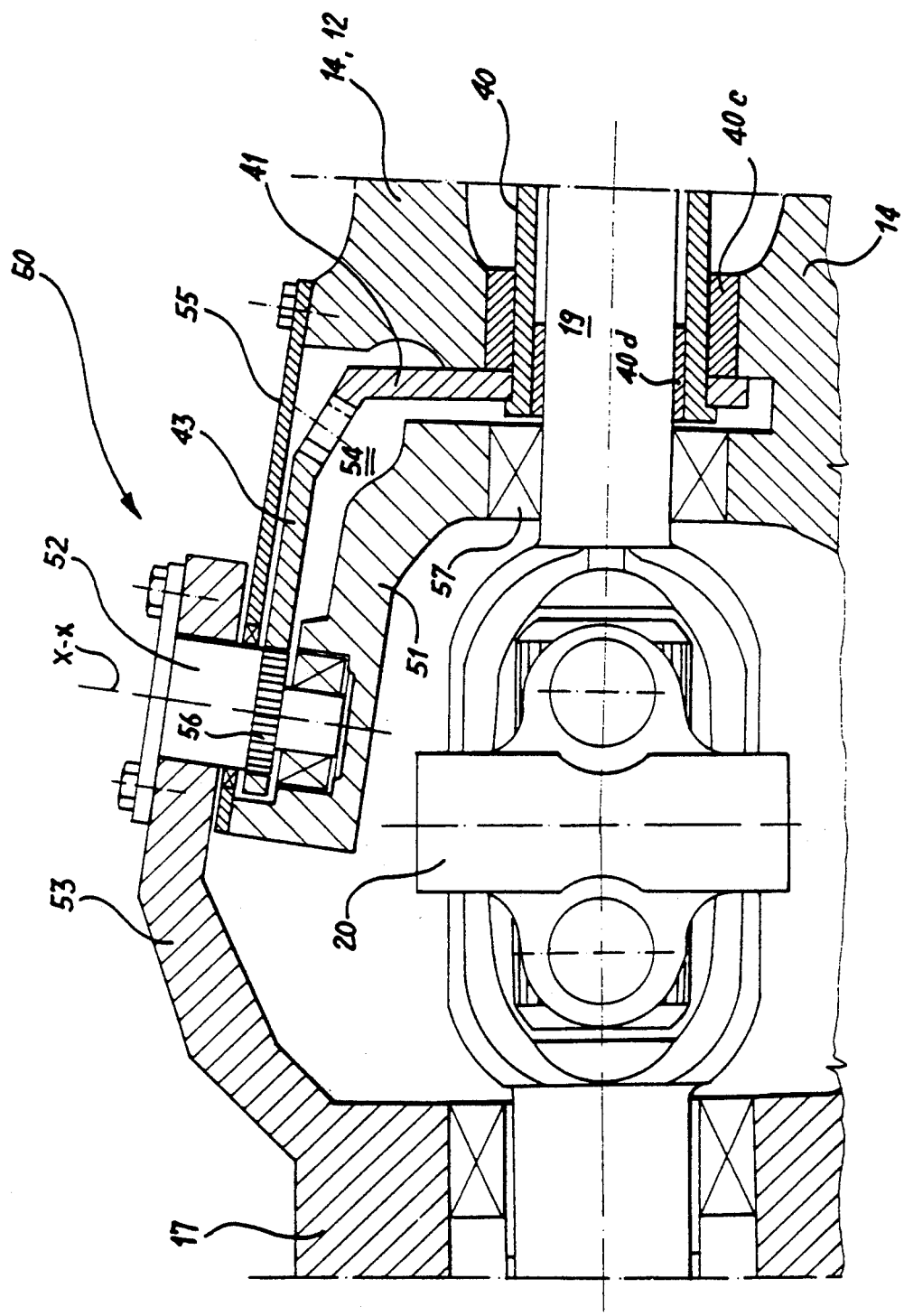
FIG. 6 is a fragmentary longitudinal section view corresponding to that of FIG. 4 and showing a modified embodiment of this invention.

Shown in FIG. 6 is a second embodiment of an axle 50 according to the invention. Similar parts are denoted by the same reference numerals as in the previous embodiment.

In this variation, the axle has a forked formation 51 (only partially shown, the omitted portion being know per se) at its opposite ends, to which a similar forked part 53 of the hub 17 is pivoted by means of pins 52.

In the forked formation 51, there is defined a chamber 54 accessible through a detachable cover 55, wherein the first and second gears 41, 43 are housed away from dust and weather. Seals 57 prevent the entry of dust into and exit of lubricant from chamber 54.

The second gear 43 fits for rotation on pin 52 over a splined section 56 of same; said pin is, in turn, rigid for rotation with the hub 17, or preferably, attachable to the hub while being also adjustable in relative angular setting through such conventional arrangements as by slotting the holes through which the screws are passed for fastening to the forked part 53, so that the amount of axle wheel toe-in can be controlled. The operation of this variation is quite similar to that of the previously described embodiment.

Figure 8:
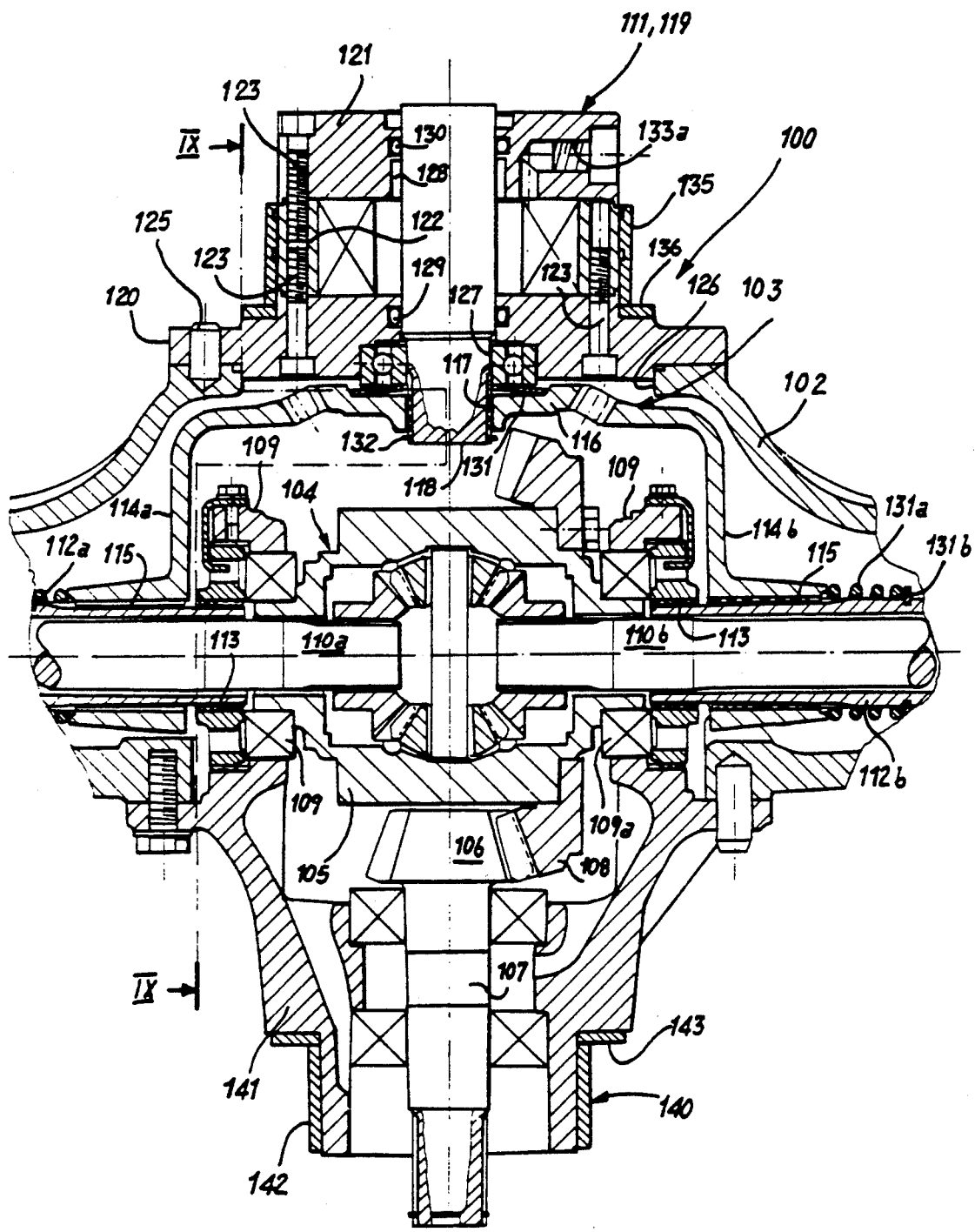
FIG. 8 is a fragmentary longitudinal section view showing another embodiment of a steering axle according to the invention.
Figure 9:
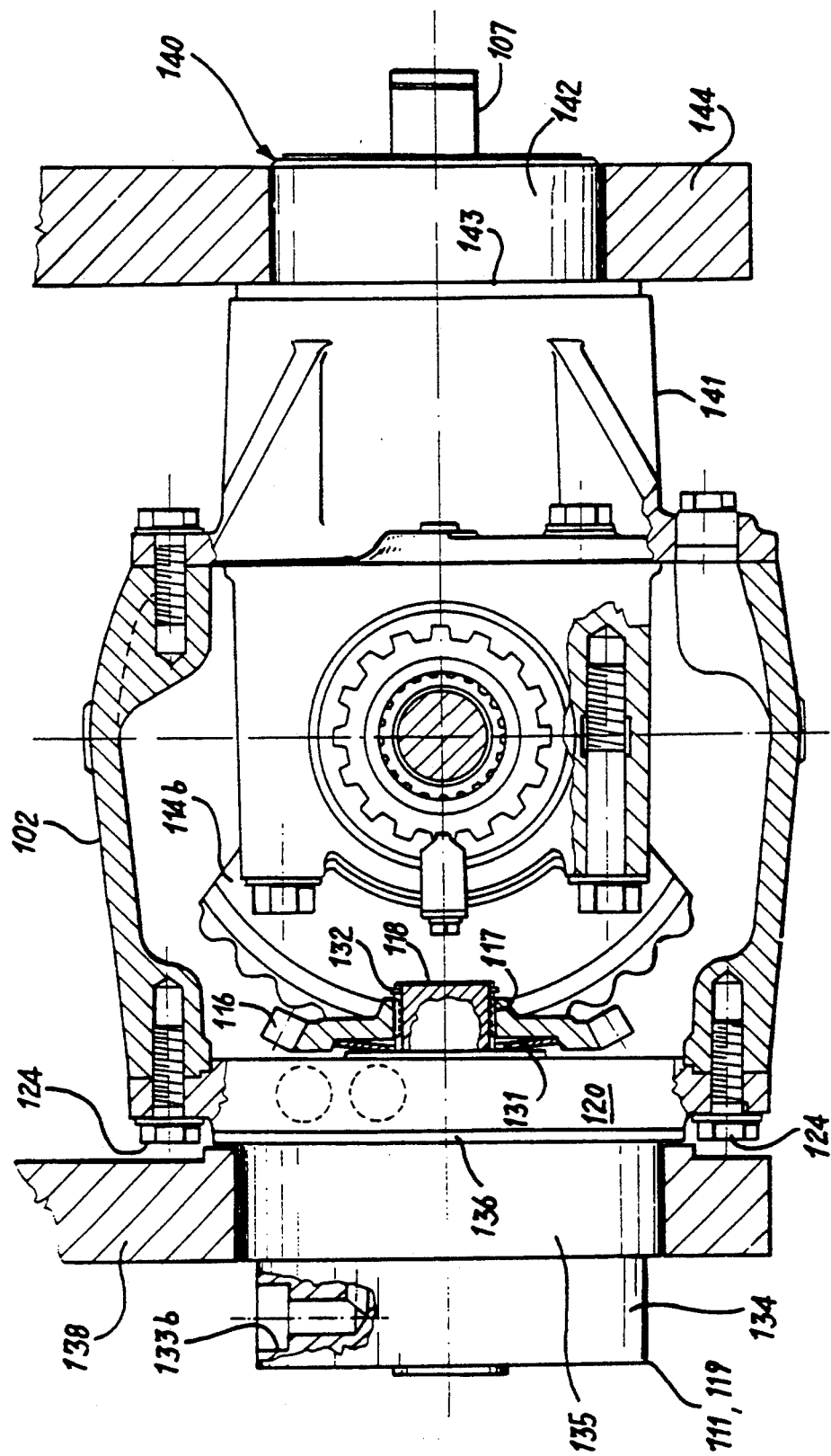
FIG. 9 is a sectional view taken along line IX—IX of the axle in FIG. 8, as assembled to a load-bearing structure of a vehicle, with said structure being only partially shown.

Indicated at 100 in FIGS. 8 and 9 is a steering power axle, such as the front axle of a four-wheel drive agricultural tractor whose load-bearing structure is only partially shown in FIG. 9. This axle 100 comprises a box-type beam 102 housing a steering mechanism 103 and transmission 104.

The transmission 104 comprises a differential mechanism 105 which includes a pinion gear 106, and respective shaft 107, and a ring gear 108; the differential mechanism 105 is designed to distribute the motion input to the pinion gear 6 differentially to two axle shafts 110a,b being each associated with a respective axle road wheel.

Said differential mechanism 105 is carried inside the beam 102 on supports 109 and conventional bearings 109a.

The steering mechanism 103 comprises a steering actuator generally indicated at 111 for operating two tubular shafts 112a,b, one for each road wheel, which fit inside the beam 102 coaxially with the axle shafts 110a,b.

On the differential mechanism 105 side, the shafts 112a,b are supported rotatably on the same supports 109 as the differential mechanism 105 with suitable bearings 113 therebetween, and carry a steering gear 114a,b each, which gear is made rotatively rigid therewith by means of a splined connection 115. On the remote side, said shafts and the axle as a whole are configured similarly to the previous embodiments.

Gears 114a,b are both in mesh engagement with a main gear 116 keyed to a shaft 118 of actuator 111 while being allowed to slide therealong by the provision of a splined connection 117.

Said actuator 111 is typically configured internally as a conventional hydraulic motor, and has been drawn schematically only, it being understood that it has—for parts not shown—a conventional design well known to a skilled person in the art, whereby the shaft 116 can be driven rotatively about its axis in either directions when supplied a suitable medium, such as a pressurized oil. It comprises a case, generally shown at 119, having two flanges 120, 121 clamped together on a sleeve 122 by means of threaded tie rods 123. Flange 120 is formed peripherally with a plurality of holes for screws 124 and pins 125 whereby the actuator can be secured at an aperture 126 in the beam 102 so as to seal it off.

Shaft 118 is supported on the flanges 120, 121 through respective bearings 127, 128 and has seals 129, 130 effective to prevent pressurized oil from leading out of the case 119 or contaminants from seeping into the actuator. Between bearing 127 and the main gear 116 is an elastic member such as a Belleville washer 131 tending to urge said gear 116 into mesh engagement with the steering gears 114a,b. A snap ring 132 is arranged at the corresponding free end of shaft 118 to prevent gear 116 from slipping off. The ring 132 is positioned to allow of an axial play for the gear 116, such that the washer 131 can perform the function of a backlash take-up device between the steering mechanism gears, as explained in detail with reference to the previous embodiments. Alternatively or additionally to washer 131, other elastic means could be provided for taking up the backlash, such as coil springs 131a or Belleville washers acting between each gear 114a,b and a shoulder on the corresponding tubular shaft 112a,b, e.g. a snap ring 131b.

Formed in the flange 121 are two conduits 133a,b, respectively for delivery and return of the working medium to/from the actuator 111. It is also contemplated that, for enhanced protection of the supply piping to the actuator, said conduits 133a,b be formed radially of the flange 120, as illustrated by dash lines in FIG. 9, to communicate, for example, proximate to that beam portion which encloses and supports shaft 107. The last-mentioned approach has not been shown because well within the ability of a person of ordinary skill in the art on the grounds of the directions given hereinabove.

The actuator case 119 has a cylindrical outer surface 134 over which there fit, at the sleeve 122 and part of flange 120, first and second washers 135, 136 having tubular and annular configurations, respectively, for a radial and axial bearing conventionally provided on a support 138 which belongs to the load-bearing structure of a vehicle equipped with the axle 100.

Thus the case 119 provides one of the two journal formations about which the axle 100 is allowed to swing. The other journal formation, shown at 140, is defined on the exterior of a collar 141 extending from the beam 102 on the transversely remote side from the case 119 coaxially therewith. Said second journal formation encircles shaft 107, providing support for it, and also includes washers 142, 143 serving the same function as the respective washers 135, 136 for a corresponding bearing provided on a support 144, again belonging to the load-bearing structure of a vehicle equipped with the axle 100.

Among the advantages afforded by the invention, and with reference in particular to the last embodiment illustrated, is that it provides optimum protection for the steering actuator while significantly reducing its space requirements. Further, the standard machining tolerances for the case of the hydraulic motor constituting the actuator are by themselves adequate to fill the requirements for accuracy of the fit between the journal formations on the beam and the supports on the load-bearing structure of the vehicle.

Also, the axle is free to swing about the journal formations without interfering with the operation of the steering system. Lastly, by having the supply conduits arranged such that they communicate to an area included between the supports on the load-bearing structure of the vehicle from the actuator or the beam, the supply piping to the actuator can be well guarded.

In addition, all external linkages can be eliminated from the box-type construction of the axle, which affords increased steering angles thanks to reduced interference with structural parts of the vehicle, elimination of space allowances externally of the axle, and a more compact design for the latter, not to mention improved protection for the steering system.

What is claimed is:

1. A steering axle for vehicles, comprising:
   a beam adapted to be mounted on a load-bearing structure of a vehicle;
   a road wheel hub supported rotatably on each of two opposite longitudinal ends of the beam;
   a steering actuator arranged to act on at least one of said road wheel hubs; and
   a steering drive interconnecting the two road wheel hubs to synchronize their relative angular displacements in accordance with pre-determined drive parameters, said steering drive comprising two shafts, synchronously counter-rotating relatively to each other and being rotatively connected to the corresponding one of the hubs through respective angle transfer gear mechanisms, said transfer mechanisms including first and second gears keyed respectively to the end of said shaft next to the corresponding hub and being made rotatively rigid with said hub;
   characterized in that said actuator is fully carried on said beam and comprises a stationary part which is rigid with the beam and independent of the load-bearing structure of the vehicle, and a movable part relatively to said stationary part which is connected to said road wheel hubs through said steering drive.

2. An axle according to claim 1 and further comprising a transmission which includes a differential mechanism and two axle shafts, each connected drivingly to the corresponding road wheel hub for motorization thereof, said counter-rotating shafts being coaxial with the respective axle shafts and each shaft being rotatively supported, proximate to the corresponding angle transfer mechanism, coaxially with the corresponding axle shaft, the shaft and axle shaft combination being supported rotatively on the axle beam, wherein said transmission includes an equal-velocity coupling interconnecting the axle shaft and the corresponding hub.

3. An axle according to either claim 2, wherein to synchronize said shafts rotation-wise, these extend to diametrically opposite sides with respect to a central gear and have both, on the remote side from the corresponding hub, a respective third gear keyed thereto which is in mesh engagement with said central gear.

4. An axle according to claim 3, wherein the steering actuator is arranged to act on said central gear.

5. An axle according to either claim 3 wherein said first and second gears and/or said third gears with said central gear have a pitch line selected to produce a drive ratio which is variable with the steering angle.

6. An axle according to claim 5, wherein said first and second gears comprise gear segments with a non-circular pitch line.

7. An axle according to claim 1, characterized in that it is a closed box-type construction, with said steering drive being received inside said box-type construction.

8. An axle according to claim 3, including means of taking up the backlash between said first and second gears, and between said third gears and said central gear.

9. An axle according to claim 8, wherein said central gear and said third gears are basically bevel gears and said backlash take-up means comprise an elastic member biasing said central gear into mesh engagement with said third gears.

10. An axle according to claim 9, wherein said backlash take-up means comprise elastic means arranged to act between the gears keyed for rotation to each counter-rotating shaft, and wherein at least one of said gears is slidable along the corresponding shaft.

11. An axle according to claim 10, wherein said elastic means are arranged to act between said slidable gear and the corresponding shaft to which it is mounted.

12. An axle according to claim 1, wherein the second gear can be shifted adjustably on the corresponding hub to control the amount of toe-in of said road wheel hubs.

13. An axle according to claim 1, wherein said beam has at least one journal formation for swing mounting the axle to a load-bearing structure of the vehicle.

14. An axle according to claim 13, wherein said steering actuator includes a case which is attached to said beam and provides said journal formation.

15. A steering axle according to claim 14, wherein the steering actuator is a hydraulic motor having a shaft extended into the beam.

16. A steering axle according to claim 14, wherein respective washers for a plain bearing are fitted over said case.

17. A steering axle according to claim 16, wherein said bearing is a radial and axial type.

18. A steering axle according to claim 14, wherein said beam has two journal formations, a first of which comprises said case and a second of which is defined on a collar extending from the beam on the trasversely remote side from said case and coaxially therewith.

19. A steering axle according to claim 18, wherein supply conduits for said actuator open to the exterior of said case and/or said beam in an area included between said journal formations.

20. A steering axle according to claim 19, wherein said conduits extend through a radial flange whereby said actuator is attached to said beam.

21. An axle according to claim 2, wherein said counter-rotating shafts are tubular and coaxial with the corresponding axle shaft and carried, on the side facing the differential mechanism, on the same supports as said differential.

* * * * *